United States Patent [19]

Viereck

[11] Patent Number: 5,170,496
[45] Date of Patent: Dec. 8, 1992

[54] CIRCUIT ARRANGEMENT FOR MATCHING THE RESONANT FREQUENCY OF AN ANTENNA RESONANT CIRCUIT TO THE OUTPUT FREQUENCY OF A TRANSMITTER OUTPUT STAGE

[75] Inventor: Bruno G. Viereck, Marzling, Fed. Rep. of Germany

[73] Assignee: Texas Instruments Deutschland GmbH, Freising, Fed. Rep. of Germany

[21] Appl. No.: 538,875

[22] Filed: Jun. 15, 1990

[51] Int. Cl.$^5$ ............................................. H04B 1/04
[52] U.S. Cl. .................................. 455/121; 455/123; 333/17.1; 343/861
[58] Field of Search ............... 455/121, 123, 107, 115; 343/860, 861, 850; 333/171.1

[56] References Cited

U.S. PATENT DOCUMENTS

| | | | |
|---|---|---|---|
| 3,919,644 | 11/1975 | Smolka | 455/123 |
| 4,654,880 | 3/1987 | Sontag | 455/121 |
| 4,965,607 | 10/1990 | Wilkins et al. | 455/123 |

FOREIGN PATENT DOCUMENTS

| | | | |
|---|---|---|---|
| 60-097728 | 10/1985 | Japan. | |
| WO88/08645 | 3/1988 | PCT Int'l Appl. | 455/123 |
| 2188202 | 9/1987 | United Kingdom. | |

OTHER PUBLICATIONS

S. L. Model and I. CLH. Newjashskij: hochfrequenzsender, VEB Verlag Technik Berlin, 1953, pp. 113–115.

Primary Examiner—Reinhard J. Eisenzopf
Assistant Examiner—Christine K. Belzer
Attorney, Agent, or Firm—Rebecca A. Mapstone; James C. Kesterson; Richard L. Donaldson

[57] ABSTRACT

In a circuit arrangement for matching the resonant frequency of an antenna resonant circuit (18) to the output circuit of a transmitter output stage (10), the antenna resonant circuit (18) is coupled via a reactance to the transmitter output stage (10). By means of a current sensor (16), the supply direct current of the transmitter output stage (10) is detected. The value of a tuning component (26), lying in the antenna resonant circuit (18), can be changed by a control signal; the tuning component is a governing factor for the resonance frequency of the antenna resonant circuit (18). A comparator and control unit (36)repeatedly samples the value of the supply direct current detected by the current sensor (16). In dependence upon the result of a comparison with a sequential previously sampled value, it applies th control signal to the tuning component (26) to obtain a maximization of the supply direct current detected.

4 Claims, 1 Drawing Sheet

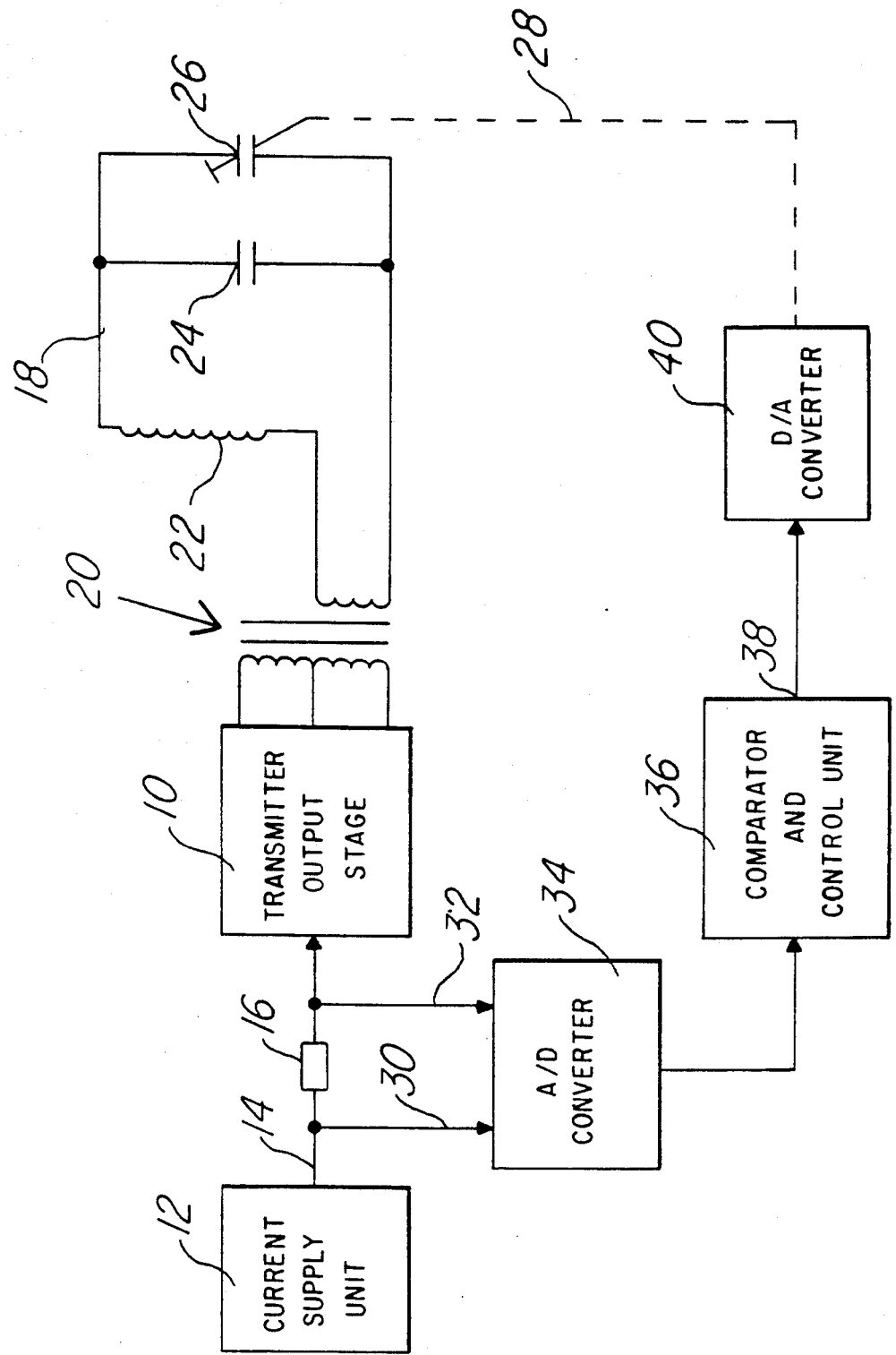

CIRCUIT ARRANGEMENT FOR MATCHING THE RESONANT FREQUENCY OF AN ANTENNA RESONANT CIRCUIT TO THE OUTPUT FREQUENCY OF A TRANSMITTER OUTPUT STAGE

FIELD OF THE INVENTION

The invention relates to a circuit arrangement for matching the resonant frequency of an antenna resonant circuit to the output frequency of a transmitter output stage to which the antenna resonant circuit is coupled via a reactance.

BACKGROUND OF THE INVENTION

A transmitter output stage can emit the power generated thereby to an antenna resonant circuit coupled loosely thereto in optimum manner only if the resonant frequency of the antenna resonant circuit is exactly matched to the output frequency of the transmitter output stage. A mistuning of the antenna resonant circuit necessarily leads to a reduction of the radiated power and thus to a reduction of the achievable range of the transmitter. In particular with portable transmitter devices, which are operated under a great variety of ambient conditions, such mistuning or off-resonance of the antenna resonant circuit can occur. If for example relatively large iron components are located in the vicinity of the antenna resonant circuit this acts like a change of the inductance of the antenna resonant circuit and this in turn necessarily results in a change in the resonant frequency. The invention is based on the problem of providing a circuit arrangement of the type mentioned at the beginning in which irrespective of changing ambient influences, an optimum transmission of the output power of the transmitter output stage to the antenna resonant circuit is always achieved.

SUMMARY OF THE INVENTION

This problem is solved according to the invention by a current sensor for detecting the supply direct current of the transmitter output stage, a tuning component which lies in the antenna resonant circuit and the value of which is variable by means of a control signal and which is codecisive for the resonant frequency, and a comparator and control unit which repeatedly samples the value of the supply direct current detected by the current sensor and in dependence upon the result of the comparison with a respective previously sampled value, applies the control signal to obtain a maximization of the detected supply direct current to the tuning component. The circuit arrangement according to the invention utilizes the fact that in a transmitter output stage which is coupled via a reactance to the antenna resonant circuit, the supply direct current of the transmitter output stage as a measure of the power transmitted by the output stage to the antenna resonant circuit. The supply direct current flowing to the transmitter end stage is therefore evaluated and employed to obtain the frequency matching of the antenna resonant circuit to the output frequency of the transmitter output stage.

Advantageous further developments of the invention are set forth in the subsidiary claims.

BRIEF DESCRIPTION OF THE DRAWINGS

An example of embodiment of the invention will now be explained with reference to the drawing, FIG. 1 of which shows the circuit arrangement according to the invention partially as block circuit diagram.

DETAILED DESCRIPTION OF THE PREFERRED EMBODIMENTS

In the drawing only the parts of a transmitter device necessary to explain the invention are illustrated. A transmitter output stage 10 is supplied with current by a current supply unit 12 via a line 14. Inserted into the line 14 is a resistor 16 through which the supply direct current flows.

An antenna resonant circuit 18 is magnetically coupled to the transmitter output stage 10 via a transformer 20. The coupling is thus via a reactance and is so configured that it may be referred to as loose coupling. The coil 22 is the actual antenna coil of the antenna resonant circuit 18 which radiates the HF signal. Further frequency-governing components in the antenna resonant circuit 18 are a capacitor 24 and a capacitor 26 which lies parallel thereto and the value of which can be changed by means of a control signal. This variation facility is indicated in the drawing symbolically by the line 28 which leads to the capacitor 26 and via which a control signal can be applied.

In operation, the voltage drop occurring at the resistor 16 and directly proportional to the supply direct current of the transmitter output stage 10 is tapped off with the aid of two lines 30 and 32, and supplied to an analog/digital converter 34. The analog/digital converter 34 converts the voltage drop to a digital signal which is supplied to a comparator and control unit 36. The comparator and control unit 36 generates at its output 38 a digital output signal which is converted in a digital/analog converter 40 to an analog signal which is applied as control signal via the line 28 to the variable capacitor 26 so that the capacitance value thereof changes.

Instead of using the D/A converter 40, in a modified embodiment a decoder could also be employed which decodes the digital output signal furnished by the comparator and control unit 36 and, in dependence upon the decoded value, actuates switches which connect or disconnect selected capacitors in parallel with the capacitor 24. It would also be possible to configure the comparator and control unit 36 in such a manner that it furnishes at its output 38 an analog signal which can be used directly to control the capacitor 26. However, as mentioned, in the embodiment described with reference to FIG. 1 the comparator and control unit 36 furnishes a digital signal at its output 38.

The comparator and control unit 36 is formed by a microprocessor which is so programmed that it generates the control signal for the capacitor 26 so that a maximization of the current flowing through the resistor 16 results. This is done in the following manner:

Since as mentioned the antenna resonant circuit 18 is coupled to the transmitter output stage via a reactance, a mistuning of the resonant frequency of the antenna resonant circuit with respect to the output frequency of the transmitter output stage 10 leads to a reduction of the supply direct current flowing through the resistor 16. A supply direct current through the resistor 16 will reach a maximum value only on optimum matching of the resonant frequency of the antenna resonant circuit and the output frequency of the transmitter output stage 10. The comparator and control unit 36 samples the output signal of the analog/digital converter 34, proportional to the supply direct current, cyclically and compares each sampled value with the immediately previous sampled value. It determines not only the deviation as such but also the direction of the deviation, i.e. it recognises whether the value detected later is greater or smaller than the previously detected value. After each comparison it furnishes at its output 38 a digital signal which is converted by the digital/analog converter 40 to the control signal for the variable capacitor 26. Since the comparator and control unit 36 can continuously detect the effects of the variation of the capacitor 26 by way of the digital signal supplied thereto from the analog/digital converter 34, it is immediately informed whether the change of the value of the capacitor 26 has led to an increase of the direct supply current through the resistor 16 or to a reduction of said current. If the change has led to a reduction of the current the comparator and control unit 36 generates a control signal which effects a change of the value of the capacitor 26 in the opposite direction because the previously effected change obviously led to further mistuning of the antenna resonant circuit 18. If however the change of the value of the capacitor 26 made has led to an increase in the supply direct current through the resistor 16 the comparator and control unit 36 then generates a control signal for a further change of the value of the capacitor 26 in the same direction to detect whether a further increase in the supply direct current can be effected, i.e. a still better matching of the resonant frequency of the antenna resonant circuit 18 to the output frequency of the transmitter output stage 10. The comparator and control unit 36 thus always generates the control signal for the capacitor 26 in such a manner that maximization of the current through the resistor 16 is achieved.

As mentioned, the comparator and control unit 36 consists of a microprocessor which can be readily programmed by an expert in such a manner that it can perform the function cycle outlined in the generation of the control signal for the capacitor 26 in dependence upon the input signal supplied thereto and proportional to the voltage drop across the resistor 16.

With the aid of the circuit arrangement outlined it is thus possible to compensate any mistuning of the antenna resonant circuit 18 which is due to ambient influences or to aging of the components involved. As a result, it is possible precisely with portable transmitter devices, which as a rule can transmit only a limited power, to offset range reductions due to a mistuning of the antenna resonant circuit.

I claim:

1. A circuit arrangement for matching the resonant frequency of an antenna resonant circuit to the output frequency of a transmitter output stage comprising:
   an antenna resonant circuit for resonating at a predetermined resonant frequency comprising a tuning component wherein said resonant frequency is dependent upon the value of said tuning component;
   a transmitter output stage having a supply direct current;
   a current sensor for detecting the supply direct current of the transmitter output stage;
   a comparator and control unit for repeatable sampling the value of the supply direct current detected by said current sensor and wherein, in dependence upon the result of a comparison between one sampled value and a respective previously sampled value, said comparator and control unit applies a control signal to said tuning component to maximize said detected supply direct current.

2. A circuit arrangement according to claim 1, wherein said current sensor (16) is a resistor through which said supply direct current of said transmitter output stage (10) flows.

3. A circuit arrangement according to claim 1, wherein said tuning component (26) in said antenna resonant circuit (18) is a capacitance, variable by means of said control signal.

4. A circuit arrangement according to claim 1, wherein said comparator and control unit (36) is part of a microprocessor.

* * * * *